United States Patent
Ophey

(10) Patent No.: US 9,057,515 B2
(45) Date of Patent: Jun. 16, 2015

(54) ILLUMINATING DEVICE FOR MACHINE TOOL

(71) Applicant: Elb-Schliff Werkzeugmaschinen GmbH, Aschaffenburg (DE)

(72) Inventor: Lothar Ophey, Kempten (DE)

(73) Assignee: ELB-SCHLIFF WERKZEUGMASCHINEN GMBH, Aschaffenburg (DE)

( * ) Notice: Subject to any disclaimer, the term of this patent is extended or adjusted under 35 U.S.C. 154(b) by 0 days.

(21) Appl. No.: 14/030,082

(22) Filed: Sep. 18, 2013

(65) Prior Publication Data

US 2014/0078714 A1 Mar. 20, 2014

(30) Foreign Application Priority Data

Sep. 18, 2012 (DE) .......................... 10 2012 108 798

(51) Int. Cl.
| | |
|---|---|
| *F21V 33/00* | (2006.01) |
| *B23Q 17/24* | (2006.01) |
| *F21V 17/12* | (2006.01) |
| *F21V 1/00* | (2006.01) |
| *F21V 31/00* | (2006.01) |
| *F21Y 101/02* | (2006.01) |
| *F21Y 105/00* | (2006.01) |

(52) U.S. Cl.
CPC ............ *F21V 33/00* (2013.01); *B23Q 17/2404* (2013.01); *F21V 1/00* (2013.01); *F21V 31/00* (2013.01); *F21V 33/0084* (2013.01); *F21V 17/12* (2013.01); *F21Y 2101/02* (2013.01); *F21Y 2105/001* (2013.01)

(58) Field of Classification Search
CPC ..... B23Q 17/24041; F21V 1/00; F21V 17/12; F21V 31/00; F21V 33/00; F21V 33/0084; F21Y 2101/02; F21Y 2105/001
USPC ........... 362/89, 90; 269/11; 408/16; 409/219, 409/235
See application file for complete search history.

(56) References Cited

U.S. PATENT DOCUMENTS

| | | | | |
|---|---|---|---|---|
| 7,828,454 | B2 * | 11/2010 | Seitz et al. ...................... | 362/89 |
| 2012/0170246 | A1 * | 7/2012 | Huang ............................ | 362/89 |

* cited by examiner

*Primary Examiner* — Stephen F Husar
(74) *Attorney, Agent, or Firm* — Myers Wolin, LLC

(57) ABSTRACT

The invention relates to an illuminating device for a machine tool, in particular, a grinding machine, wherein the illuminating device is arrangeable at a machine table of the machine tool, and is displaceable with the machine table, characterized in that the illuminating device comprises a first housing in which an illuminating module having a number of illuminating means is arranged, and in that a transparent plate is arranged at the first housing on the side of the illuminating means, wherein the transparent plate is configured so as to disperse the light emitted from the illuminating means substantially evenly. Further, a machine tool, in particular, a grinding machine, equipped with the illuminating device according to the invention is provided by the invention.

9 Claims, 3 Drawing Sheets

ILLUMINATING DEVICE FOR MACHINE TOOL

CROSS-REFERENCE TO RELATED APPLICATIONS

This application claims priority to German Application No. 10 2012 108 798.9, filed on Sep. 18, 2012, the contents of which are hereby incorporated by reference.

FIELD OF THE INVENTION

The invention relates to an illuminating device for a machine tool, in particular, a grinding machine, wherein the illuminating device may be arranged at a machine table, and to a machine tool, in part a grinding machine with an illuminating device according to the invention.

BACKGROUND

With respect to machine tools, in particular, grinding machines and milling machines, it is known to illuminate the work area with a light bulb. The use of light bulbs for illumination of the work area, however, has the disadvantage that only a small area of the work area can be illuminated in an optimal manner. Further, due to the substantially pointed illumination, a disturbing shadow cast may occur.

If the light bulb and the illuminating device, respectively, are arranged at the machine table of the machine tool, and is displaceable with the machine table, the use of light bulbs also is disadvantageous, because due to the displacement of the machine table, mechanical stress may be imposed on the illuminating device and the light bulb, respectively, resulting in a substantial reduction of the life time of the light bulb.

OBJECT OF THE INVENTION

Therefore, it is an object of the present invention, to at least partially avoid the disadvantages known from prior art, and to provide an illuminating device for a machine tool enabling a better illumination of the work area of the machine tool and, moreover, being less susceptible to mechanical stress.

Solution According to the Invention

According to the invention this problem is solved by an illuminating device for a machine tool, in particular, a grinding machine or a milling machine, as well as by a machine tool with the illuminating device according to the invention according to the independent claims. Preferred embodiments of the invention are defined in the respective dependent claims.

Thus, an illuminating device for a machine tool, in particular a grinding machine or milling machine, is provided wherein the illuminating device is arrangeable at the machine table of the machine tool, and is displaceable with the machine table. The illuminating device is characterized according to the invention in that the illuminating device comprises a first housing in which an illuminating module with a number of illuminating means is arranged, and in that at the first housing a transparent plate is arranged on the side of the illuminating means, the transparent plate being configured so as to disperse the light substantially evenly.

By using a number of illuminating means, an enlarged illuminated area is provided such that a substantially larger area of the work area of the machine tool is illuminated in an optimal manner. By the use of a transparent plate which disperses the light emitted by the illuminating means substantially evenly, an area illumination is provided by means of which, on the one hand, a large work area of the machine tool may be illuminated in an optimal manner, and, on the other hand, disturbing shadow cast is prevented to a large extent.

The transparent plate may be fixed to the first housing by means of a clamp frame, preferably, by means of fixing screws. Alternatively, a clip mechanism for fixing the clamp frame at the first housing may be provided. Thereby, a fast and tool-free replacement of the illuminating module is enabled.

The transparent plate and/or the clamp frame may close the first housing in a substantially water-tight manner. This is of particular advantage, if the work piece to be processed has to be cooled during the processing by means of a liquid coolant.

For this, a circumferential sealing, for example, a rubber sealing, may be provided at the housing or at the transparent plate and at the clamp frame, respectively.

It has been found to be particularly advantageous if the illuminating means comprise light emitting diodes (LED). The use of LEDs has the advantage that these are less susceptible to mechanical stress than common light bulbs or other illuminating means. A further advantage is that the illuminating means may be operated in a more energy-saving manner. All in all, the illuminating means may be operated substantially longer before a replacement of the illuminating means becomes necessary.

It is advantageous, if the illuminating means comprise light strips having a number of light emitting diodes. Thereby, a particularly simple production of the illuminating device according to the invention is enabled, because light strips with LEDs are available in a desired length and with a desired number of LEDs.

The light strips and the illuminating means (LEDs), respectively, may be coupled to a control unit. The control unit may be configured so as to individually control each light strip and each illuminating means. Thereby, the light intensity and brightness, respectively, of each LED may be adjusted individually.

It is preferred, if the illuminating means are distributed substantially evenly such that a substantially uniform light emission is effected over the entire area of the illuminating device. Further, thereby a disturbing shadow cast may be further reduced.

It has been found to be especially advantageous, if the transparent plate comprises a glass pane, preferably made from opaque flint glass, in particular, a translucent glass pane or frosted pane. Thereby, an especially good dispersion of the light emitted from the illuminating means is achieved, and at the same time, the illuminating means are particularly well protected. Hereby, it is advantageous, if the glass pane has a scratch-proof coating.

In an embodiment of the illuminating device according to the invention, the illuminating device may comprise a second housing, which is arranged in a certain angle with respect to the first housing, and which has an illuminating module and a transparent plate, which are arranged substantially in the same manner in the second housing and at the second housing, respectively, as the illuminating module and the transparent plate of the first housing.

Thereby, an even better illumination of the work area of the machine tool is achieved, and at the same time, shadow cast is even further reduced. In a further embodiment of the invention, even further second housings may be arranged at the first housing.

According to an even further embodiment of the invention, the second housing/housings may also be arrangeable directly at the machine table.

Further, according to the invention, a machine tool, in particular, a grinding machine or milling machine, is provided, which has an illuminating device according to the invention, wherein the illuminating device is arranged at a machine table of the machine tool, and is displaceable with the machine table.

It is preferred, if the illuminating device is arranged above a positioning means at the machine table in order to move the illuminating device relative to the machine table and to lock it in a predetermined position relative to the machine table. Thereby, the area illumination provided by the illuminating device according to the invention may be adjusted in an optimal manner to the work piece to be processed and to the tools used, respectively, to on the one hand, achieve an optimal illumination of the work area, and on the other hand, to minimize shadow cast.

BRIEF DESCRIPTION OF THE FIGURES

Further details and features of the invention as well as concrete, in particular, preferred embodiments of the invention become clear from the following description in connection with the drawings.

DETAILED DESCRIPTION OF THE INVENTION

Figure 1:
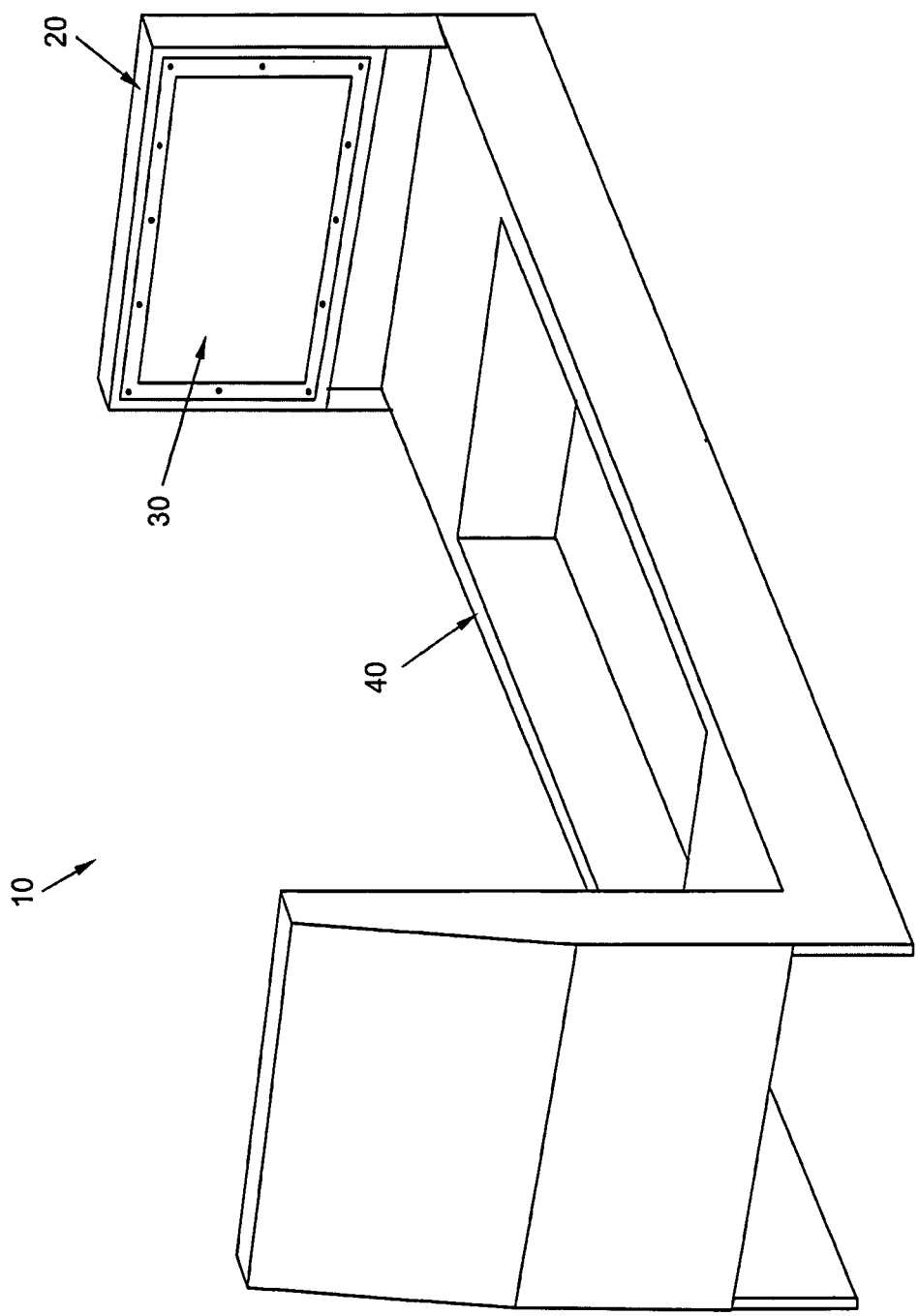
FIG. 1 shows a schematic illustration of a machine table with an illuminating device according to the invention being arranged thereon.

FIG. 1 shows a schematic illustration of a machine table 10 of a machine tool, for example, a grinding machine or a milling machine. The machine table 10 has clamping means not shown here, by means of which the work piece to be processed may be clamped in the machine tool.

On the right hand side of the desk tray 40 of the machine tool 10, a spray screen 20 is arranged. At the inner side of the spray screen 20 which faces the work piece to be processed, an illuminating device 30 is arranged by means of which the work piece clamped in the machine tool and in the machine table, respectively, is illuminated or lighted, respectively. The desk tray 40 is mounted on the machine table such that the illuminating device 30 is displaceable together with the machine table. Thereby, during the entire processing procedure, an optimal illumination of the work piece is guaranteed.

The spray screen 20 has terminals not shown here for power supply of the illuminating device. Further, also terminals for a control unit provided in the illuminating device for controlling the illuminating device may be provided.

Figure 2:
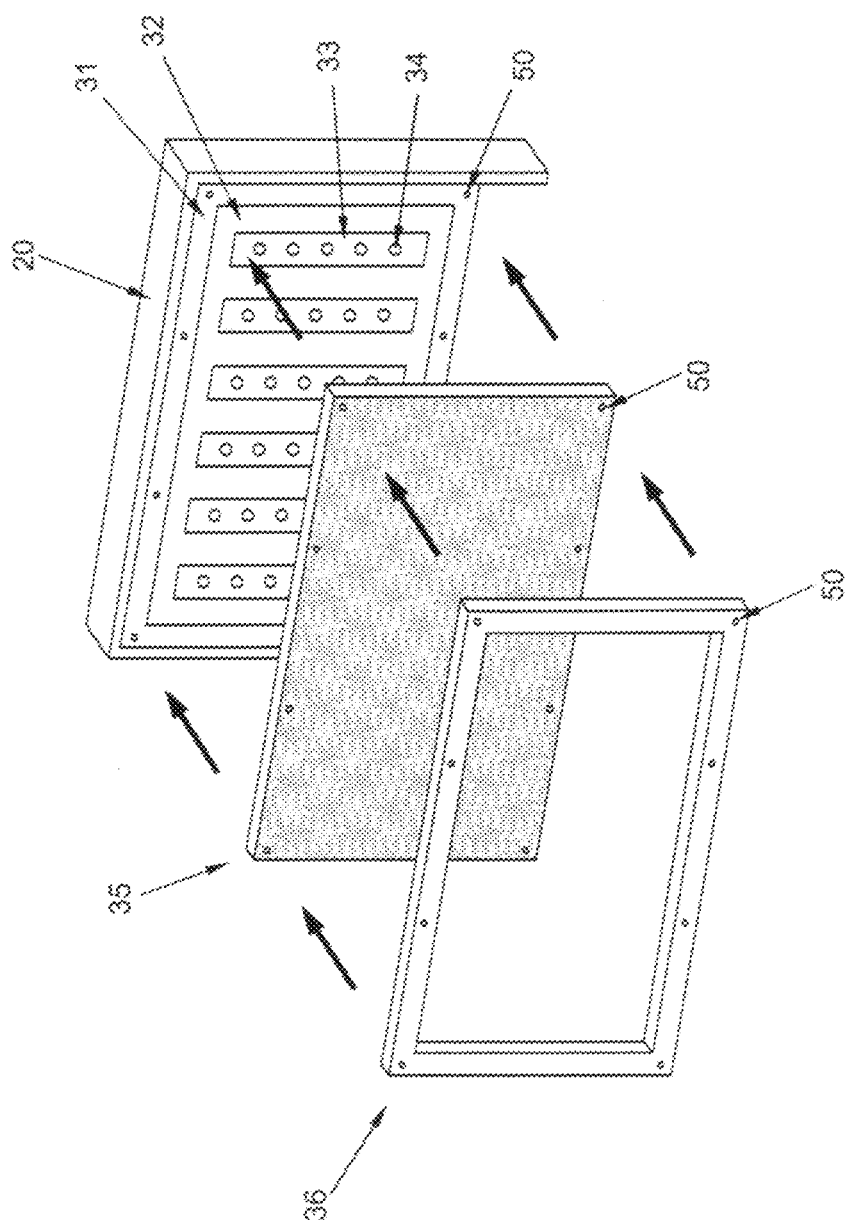
FIG. 2 shows an assembly of an illuminating device according to the invention in an exploded view.

FIG. 2 shows an illuminating device according to the invention in a spray screen 20 of the desk tray 40 in an exploded view.

In the spray screen 20, at first, a housing 31 of the illuminating device 30 is arranged. In the housing 31, an illuminating module 32 is provided, which has a number of illuminating means 34, preferably light emitting diodes. In the embodiment of the invention shown in FIG. 2, the illuminating module 32 has a number of light strips 33, which each have a number of light emitting diodes. The use of light strips with LEDs, so called LED strips, has the advantage that these are already available as required such that the expenditure in manufacturing for the manufacture of an illuminating device according to the invention may be substantially reduced.

In the embodiment shown in FIG. 2, the illuminating module 32 has six light strips 32. Of course, also more than six or less than six light strips may be provided which eventually depends on the concrete application of the illuminating device.

The light strips 33 and the light emitting diodes 34, respectively, may be coupled to a control module or control unit, respectively, not shown here. The control module may be configured to individually control each light strip 33 or each light emitting diode, respectively, in order to individually adjust the light intensity or brightness, respectively, of each light strip 33 or each light emitting diode 34, respectively. Thereby, different illumination scenarios may be realized such that a particularly well illumination of the work area with at the same time minimized shadow cast is enabled. The control unit not shown here may be coupled to an operating panel of the machine tool.

By means of the control module, the light strips 33 and the light emitting diodes 34, respectively, may also be pulsed in that the LEDs are turned on and off, respectively, cyclically. The cycle, thereby, may be adjusted to the rotational speed of the machine tool such that for an observer, a substantially static image of a moving tool is obtained. Thereby, during a grinding procedure, the work piece may be subject to visual monitoring of the observer.

After mounting of the housing 31 with the illuminating module 32 arranged thereon in the spray screen 20, a transparent plate 35 is placed on the housing 31 from the side of the illuminating means. The transparent plate is configured such that the light emitted from the illuminating means is dispersed substantially evenly. In an embodiment of the invention, for this, a translucent glass pane or frosted pane may be used. According to the requirements with respect to the illuminating device, the transparent plate may be provided with a scratch proof coating. As an alternative to a translucent glass pane or a frosted pane, respectively, also opaque plastic panes may be used. In a further alternative embodiment of the invention, completely transparent panes may be used also which are coated with an opaque foil.

After the mounting of the transparent plate 35 on the housing 31, at the front side of the transparent plate 35 a clamp frame 36 is arranged by means of which the transparent plate 35 is fixed to the housing 31 and to the spray screen 20, respectively. For this, the clamp frame 36 as well as the transparent plate 35 and the housing 31 have screw holes 50 which are provided for the reception of fixing screws by means of which the clamp frame 36, the transparent plate 35 and the housing 31 may be screwed to each other.

It is advantageous, if the transparent plate 35 is fixable to the housing such that it closes the housing 31 in a substantially water-tight manner. For this, it may be advantageous to arrange at the housing 31 or at the rear side of the transparent plate 35 a circumferential rubber sealing which guarantees a substantially water-tight closure.

Figure 3:
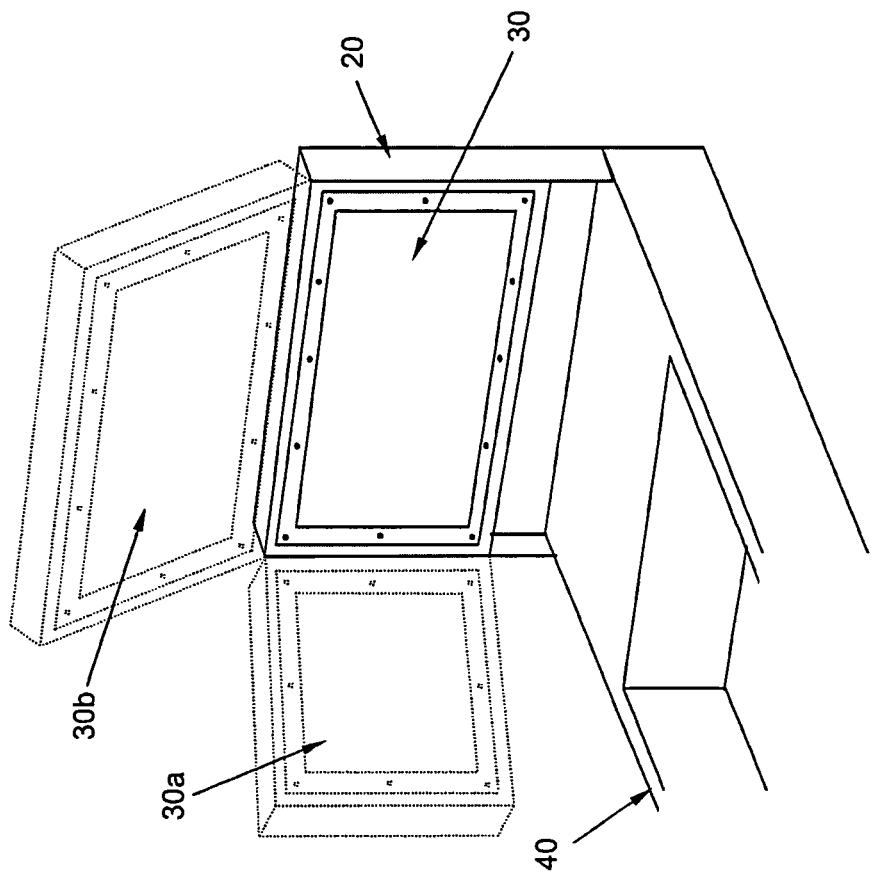
FIG. 3 shows an embodiment of a machine table with three illuminating devices according to the invention, whereby two of the three illuminating devices are movable relative to the machine table.

FIG. 3 shows a further embodiment of an illuminating device according to the invention.

Here, the illuminating device has thee single illuminating devices 30, 30*a*, 30*b*, wherein the illuminating device 30*a* and 30*b* are arranged in a certain angle with respect to the illuminating device 30. Thereby, an even further improved illumination of the work area is enabled. It is advantageous, if the single illuminating devices 30, 30*a*, and 30*b* are movable relative to each other or relative to the machine table, respectively. With respect to the embodiment shown in FIG. 3, the illuminating devices 30*a*, 30*b* are hinged pivotally to the illuminating device 30 such that the angle between these two illuminating devices 30a, 30b may be adjusted or modified, respectively, with respect to the illuminating device 30.

The two illuminating devices 30a, 30b may also be arranged directly at the machine table of the machine tool, preferably pivotally. The assembly of the illuminating devices 30a, 30b essentially corresponds to the assembly of the illuminating device 30.

It is advantageous, if the illuminating means are arranged at the machine table by means of a positioning means by means of which the illuminating means can be moved relative to the machine table, and may be locked in a predetermined position relative to the machine table.

Further, also the additional illuminating devices 30a, 30b may respectively comprise a control module by means of which the single light strips and the single light emitting diodes, respectively, may be controlled individually.

The illuminating device according to the invention may also be used in a machine tool which has a totally enclosing housing which is closable during the processing procedure of the work piece.

The illuminating device according to the invention has been described above with respect to a grinding machine or a milling machine, respectively. Of course, the illuminating device according to the invention may also be used with other machine tools, for example, with a drilling machine or another cutting machine tool.

LIST OF REFERENCE NUMERALS 10 machine table of the machine tool (e.g., grinding machine)
20 spray screen of the desk tray of the grinding machine
30 illuminating device of the machine tool
30a, 30b further illuminating devices
31 housing
32 illuminating module
33 light strip with illuminating means
34 illuminating means, preferably, LED
35 transparent plate, e.g., glass pane, preferable from opaque flint glass (translucent glass pane or frosted glass)
36 clamp frame
50 screw holes

The invention claimed is:

1. An illuminating device (30) for a machine tool wherein the illuminating device is arrangeable at a machine table (10) of the machine tool, and is displaceable with the machine table, the illuminating device comprising:
   a first housing (31) in which an illuminating module (32) having a number of illuminating means (34) is arranged, and
   a transparent plate (35) arranged at the first housing on the side of the illuminating means,
   wherein the transparent plate is configured so as to disperse light emitted from the illuminating means (34) substantially evenly,
   wherein the transparent plate (35) comprises a glass pane, and
   where the glass pane is opaque flint glass.

2. The illuminating device of claim 1, wherein the transparent plate (35) is fixed to the first housing (31) by means of a clamp frame (36).

3. The illuminating device of claim 1, wherein the transparent plate (35) or the clamp frame (36) close the first housing (31) in a substantially water-tight manner.

4. The illuminating device of claim 1, wherein the illuminating means (34) comprise light emitting diodes (LED).

5. The illuminating device of claim 1, wherein the illuminating means (34) comprise light strips with a number of light emitting diodes (LED).

6. The illuminating device of claim 1, wherein the illuminating means (34) are distributed substantially evenly.

7. An illuminating device (30) for a machine tool wherein the illuminating device is arrangeable at a machine table (10) of the machine tool, and is displaceable with the machine table, the illuminating device comprising:
   a first housing (31) in which an illuminating module (32) having a number of illuminating means (34) is arrange, and
   a transparent plate (35) arrange at the first housing on the side of the illuminating means,
   wherein the transparent plate is configured so as to disperse light emitted from the illuminating means (34) substantially evenly,
   and the illuminating device further comprising a second housing which is arranged at a certain angle with respect to the first housing, and which has an illuminating module and a transparent plate, which are arranged in the second housing or at the second housing, respectively, substantially in the same manner as the illuminating module and the transparent plate of the first housing.

8. An illuminating device (30) for a machine tool wherein the illuminating device is arrangeable at a machine table (10) of the machine tool, and is displaceable with the machine table, the illuminating device comprising:
   a first housing (31) in which an illuminating module (32) having a number of illuminating means (34) is arrange, and
   a transparent plate (35) arrange at the first housing on the side of the illuminating means,
   wherein the transparent plate is configured so as to disperse light emitted from the illuminating means (34) substantially evenly, and
   wherein the illuminating device is arranged at a machine table (10) of the machine tool and is displaceable with the machine table.

9. The machine tool according to claim 8, wherein the illuminating device (30) is arranged at the machine table by means of a positioning means in order to move the illuminating device relative to the machine table, and to lock it in a predetermined position relative to the machine table.

* * * * *